United States Patent [19]

Fischer

[11] Patent Number: 5,256,166
[45] Date of Patent: Oct. 26, 1993

[54] TERPOLYMER OF ETHYLENE, VINYL ACETATE AND ISOBUTYLENE USEFUL AS POUR POINT DEPRESSANTS IN DISTILLATE OILS

[75] Inventor: Joseph Fischer, Cincinnati, Ohio

[73] Assignee: National Distillers and Chemical Corporation, New York, N.Y.

[21] Appl. No.: 368,122

[22] Filed: Jun. 16, 1989

Related U.S. Application Data

[63] Continuation-in-part of Ser. No. 678,945, Dec. 6, 1984, abandoned.

[51] Int. Cl.$^5$ ............................................... C10L 1/18
[52] U.S. Cl. ............................................................ 44/393
[58] Field of Search ............................ 44/62, 70, 393

[56] References Cited

U.S. PATENT DOCUMENTS

| | | | |
|---|---|---|---|
| 3,467,597 | 9/1969 | Tunkel et al. | 44/66 |
| 4,178,950 | 12/1979 | Sweeney | 44/62 |
| 4,178,951 | 12/1979 | Sweeney | 44/62 |
| 4,375,973 | 3/1983 | Rossi et al. | 44/62 |

FOREIGN PATENT DOCUMENTS

| | | |
|---|---|---|
| 0099646 | 1/1984 | European Pat. Off. |
| 1462628 | 1/1977 | United Kingdom |

*Primary Examiner*—Margaret Medley
*Attorney, Agent, or Firm*—Kenneth D. Tremain; Gerald A. Baracka

[57] ABSTRACT

Terpolymers of ethylene, vinyl acetate and controlled amounts of isobutylene useful as pour point depressants in distillate oils.

14 Claims, No Drawings

TERPOLYMER OF ETHYLENE, VINYL ACETATE AND ISOBUTYLENE USEFUL AS POUR POINT DEPRESSANTS IN DISTILLATE OILS

This application is a continuation-in-part of application Ser. No. 678,945, filed Dec. 6, 1984 now abandoned.

BACKGROUND OF THE INVENTION

This invention relates to terpolymers and more particularly to terpolymers of ethylene, vinyl acetate and isobutylene useful as pour point depressants and/or flow improvers in distillate fuel oils.

The serious concern over supplies of petroleum has led to increased interest in diesel engines for passenger automobiles because of their proven economy in operation. Distillate oil fuels for automotive use must be made suitable, in cold weather, for uninterrupted service. Pour point depressants to promote cold temperature pour are added by the producer of the distillate or may be sold in automobile supply outlets, for direct addition by the consumer. In either case, a clear pour point additive is desirable from a marketing standpoint. Often a multiadditive system is prepared which combines pour point effectiveness with other functions such as corrosion inhibition and detergency to reduce nozzle deposits.

The use of ethylene-vinyl acetate copolymers to improve the low temperature pour characteristics of distillate oils has long been known. U.S. Pat. No. 3,048,479 describes the use of ethylene-vinyl acetate copolymers containing about 20 percent by weight vinyl acetate to improve the pour of distillate fuels. Such polymers are prepared in a solvent such as benzene at low pressures of around 800 psi using ditertiary butyl peroxide. U.S. Pat. No. 3,627,838 describes a process for manufacturing an ethylene-vinyl acetate copolymer containing 28 to 60 weight percent vinyl acetate where the monomers are reacted at a temperature of 280° F. to 340° F. under a pressure of 700 to 2000 psi in a solvent with azo compounds or peroxides such as ditertiary butyl peroxide. Similar processes are described in U.S. Pat. No. 3,126,364 and U.S. Pat. No. 3,254,063. A further modification in the use of ethylene-vinyl acetate copolymers as pour depressants is shown in U.S. Pat. No. 3,961,916 wherein two synthetic ethylene-vinyl acetate copolymers differing by at least 5 weight percent vinyl ester content are separately prepared and blended to produce a pour depressant additive.

A slightly different approach is disclosed in U.S. Pat. No. 4,087,255 which describes the preparation of ethylene-vinyl acetate copolymers for use as pour point depressants by reacting the monomers in an inert solvent at relatively low temperatures (70° to 120° C.) and pressures of 700 to 3000 psig. Polymers produced in this manner, having a molecular weight around 1000-2900, show reduced branching characterized by 2-methyl side branches per 100 methylene groups.

Other patents disclose the use of terpolymers of ethylene, vinyl acetate and monolefinically unsaturated polymerizable monomers for use as pour point depressants. For example, U.S. Pat. No. 3,467,597 discloses terpolymers of ethylene, vinyl acetate and butylenes. U.S. Pat. No. 3,638,349 discloses copolymers of ethylene and vinyl acetate wherein up to 20% of the copolymer can be other polymerizable unsaturated monomers. U.S. Pat. No. 4,178,950 discloses terpolyumers of ethylenevinyl acetate-butylene prepared by solution polymerization and of a number average molecular weight of about 5,000 to about 80,000, preferably 12,000 to about 60,000.

Improved pour point depressants having better clarity compared to presently used EVA copolymers, which are hazy at room temperature, and which suffer no adverse effects insofar as compatibility and response in distillate fuels are very much desired.

SUMMARY OF THE INVENTION

In accordance with the present invention, polymers which are of improved clarity compared to presently used EVA copolymers (which are very hazy at room temperature) are provided. The clearer polymers of the present invention suffer no adverse effects insofar as compatibility and response in distillate fuels. They offer improved performance because the degree of branching can be controlled by blending or by direct synthesis. The polymers can be produced without the need for inert solvents, which must be removed before the product can be used.

DETAILED DESCRIPTION OF THE INVENTION

It has been found that clear ethylene-vinyl acetate polymers can be produced herein by utilizing isobutylene as a monomer along with vinyl acetate. Since isobutylene is incorporated in the polymer chain, a terpolymer containing ethylene, vinyl acetate, and isobutylene is produced. The product, produced as described below, is a sparkling clear liquid at room temperature. When compared with an ethylene-vinyl acetate copolymer of similar viscosity and vinyl acetate content, the latter product is very hazy. Moreover, surprisingly, polymers with controlled amounts of the isobutylene terpolymer are found to be effective in lowering the pour point of distillate fuels while also possessing other requisite properties, such as good cold filter plugging point (CFPP) performance and good filterability. Specifically, ethylenevinyl acetate-isobutylene terpolymers with methyl per 100 methylene group ratios of about 2 to about 15, preferably about 4 to about 12, are found to perform better and have better clarity than copolymers of similar vinyl acetate content.

The ethylene-vinyl acetate-isobutylene terpolymers of the present invention are prepared by nonsolution, high pressure polymerization. In general these procedures involve free-radical polymerization in a stirred autoclave reactor designed to operate at high pressures of ethylene in a continuous manner. The ethylene pressure may vary from about 10,000 psig to about 35,000 psig, pressures of about 19,000 psig to about 30,000 psig are preferred. Vinyl acetate monomer is introduced into the aforesaid stirred autoclave reactor at a flow rate sufficient to produce a product containing about 30 to about 45 weight percent of combined vinyl acetate. The rate of isobutylene introduction depends on the rate of vinyl acetate introduction, and may range from about 0.1 to about 10 times the rate of vinyl acetate monomer flow rate to the reactor; flow rates of isobutylene to the reactor that are preferred will be about 0.1 to about 5 times the rate of vinyl acetate monomer flow rate. In addition, since the ethylene-vinyl acetate-isobutylene terpolymers of this invention are desirably of relatively low molecular weight, having a viscosity of about 100 to about 300 centipoise (cP) as measured at 140° C. in a Brookfield Thermosel viscometer, a suitable chain transfer agent may also be introduced into the reactor, despite the fact the isobutylene, in addition to acting as a monomer, also shows chain-transfer activity. Lower molecular weight methyl ketones and aldehydes are employed as chain transfer agents. Examples of the useful ketones are acetone, methyl ethyl ketone, methyl isobutyl ketone, and the like; examples of the useful aliphatic aldehydes are formaldehyde, acetaldehyde, propionaldehyde, isobutyraldehyde, and the like. Acetone and acetaldehyde are preferred, acetaldehyde being especially preferred.

When acetone is employed as chain transfer agent, its flow rate to the reactor will range from about 0.3 to about 1 times the flow rate of vinyl acetate monomer; a flow rate of about 0.6 to about 0.85 times the VA flow rate being preferred. When acetaldehyde is used as the chain transfer agent, its flow rate can be lower, from about 0.01 to about 0.3, preferably about 0.04 to about 0.1, times the flow rate of vinyl acetate monomer to the autoclave reactor.

The polymerization process of this invention is carried out at temperatures of about 225° to about 475° F.; a temperature of about 250° to about 450° F. is preferred. The temperature profile over the reactor may be held relatively constant or it may be relatively broad, as much as 150° F. in certain instances.

Free-radical initiators are employed in the process of the invention. In general, these are peroxygen compounds, for example, hydroperoxides, dialkyl peroxides, peroxyacids and esters of peroxy acids and typically, include tert-butyl hydroperoxide, di-tert-butyl peroxide, peracetic acid, tert-butyl peracetate, tert-butyl perisobutyrate, tert-butyl perpivalate (also known as pertrimethylacetate), tert-butyl peroctoate, di-sec-butyl peroxydicarbonate, and the like.

Preferred initiators are tert-butyl perpivalate, tert-butyl peroctoate and di-sec-butyl peroxydicarbonate. Two or more initiators may be used in a given polymerization.

When the polymerization process of this invention is performed as disclosed hereinabove, a terpolymer product is obtained that contains from about 30 to about 45 weight percent combined vinyl acetate, preferably from about 30 to about 40 weight percent vinyl acetate. The remainder of the terpolymer product will consist of ethylene and isobutylene of which ethylene makes up the major proportion. The isobutylene content is manifested largely in terms of a methyl to 100 methylenes ratio; as determined by proton nuclear magnetic resonance (proton NMR). A typical ethylene-vinyl acetate copolymer prepared by the process of this invention will exhibit a methyl to 100 methylenes ratio of about 2, but terpolymers containing increasing combined isobutylene content will have methyl to 100 methylene ratios in the range of about 2 to about 15, preferably from about 4 to about 12. At higher methyl to 100 methylene ratios, the terpolymers of this invention are no longer effective as pour point depressants. Thus, the methyl to 100 methylene ratio is very critical.

The molecular weight of the terpolymers of the invention is also an important property in relation to their performance as pour point additives to distillate fuel oils. Molecular weights may be determined by vapor pressure osmometry or by size exclusion chromotography (SEC). Both number average molecular weights (Mn) and weight average molecular weights (Mw) may be determined for the products of this invention by the SEC method. The Mn of the useful terpolymers of this invention ranges from about 400 to about 1200, preferably from about 500 to about 900; while the Mw of these terpolymers ranges from about 1500 to about 3000, preferably from about 2000 to about 2500.

As pointed out hereinabove, the ethylene-vinyl acetate-isobutylene terpolymers of this invention are surprisingly found to exhibit improved clarity relative to ethylene-vinyl acetate copolymers of similar vinyl acetate content. In fact, the terpolymers of this invention, prepared under conditions that favor maximum incorporation of isobutylene, are transparent, viscous liquids but, unfortunately, do not sufficiently depress the pour point of distillate fuels. Only those with a methyl to 100 methylene ratio of about 2 to about 15, preferably about 4 to about 12, provide the desired pour point depressing action. Nevertheless, these latter ethylenevinyl acetate-isobutylene terpolymers with controlled isobutylene content still possess greatly improved clarity relative to ethylene-vinyl acetate copolymers of similar vinyl acetate content, which are very hazy materials. Since pour point additives are generally handled and dispensed as concentrated solutions in a hydrocarbon solvent, said solutions of ethylene-vinyl acetate copolymers are also very hazy, whereas the corresponding solutions of the ethylene-vinyl acetate-isobutylene terpolymers of this invention, having controlled isobutylene contents to give methyl to 100 methylene ratios of about 2 to about 15, preferably about 4 to about 12, will exhibit greatly improved clarity.

The terpolymers of the present invention act as pour point depressants when effective amounts of the terpolymer are added to distillate fuel oils. Useful amounts of the terpolymer range from about 100 to about 1000, preferably about 200 to about 800, ppm by weight of the fuel oil being treated.

The terpolymers of this invention may be used alone as the sole additive or in combination with other oil additives, such as corrosion inhibitors, antioxidants, sludge inhibitors, etc.

The invention will be further understood by reference to the following examples

COMPARATIVE EXAMPLE 1

Ehtylene and vinyl acetate were pumped to a stirred high pressure autoclave and reacted at a pressure of 30,000 psig. The catalyst used was t-butyl perpivalate. Temperature in the reactor was 331° F. at the bottom and 333° F. at the top. The vinyl acetate was pumped at rate of 63 gal/hr. Acetone (a chain transfer agent) was pumped, to give a low molecular weight polymer, at a rate of 47 gal/hr. The final product had a vinyl acetate content of 36.3% and a viscosity of 163 cP at 140° C. It was a very hazy liquid at room temperature.

This EVA copolymer was tested in a No. 2 fuel oil with a distillation range of 193° F. to 320° F. The ASTM D-97 pour point of the base fuel was −10° C. At a level of 200 ppm, this EVA copolymer reduced the pour point to −16° C. However, while the product showed good pour response in the fuel, it failed to satisfy the fluidity test at −20° F. which is required for commercial products. The fluidity test measures the quantity of a premeasured amount (40 ml) of oil which flows through a small orifice in three minutes after being kept at the test temperature for two hours. A flow of 32 ml (80%) of the 40 ml aliquot of treated oil is required for a satisfactory rating. This product, when tested at a level of 900 ppm in oil gave only a 6 percent recovery. Hence, while it would act to depress the pour point, it was not satisfactory for commercial use.

EXAMPLE 2

Ethylene and vinyl acetate were pumped to a stirred autoclave reactor designed to operate at high pressure. The reaction was carried out at 20,000 psi using t-butyl perpivalate as the catalyst. The feed gas temperature was 129° F. and the temperature in the reactor ranged from 327° F. at the bottom to 383° F. at the top. The vinyl acetate was pumped at 30 gallons per hour and isobutylene was added at about 95 gallons per hour to produce a low molecular weight terpolymer. The terpolymer product had a vinyl acetate content of 39.2%, a viscosity at 140° C. of 402 cP and a $CH_3/100\ CH_2$ ratio of 19.9, as determined by proton NMR. This product was water white and clear with no haze at room temperature.

When tested in number 2 fuel oil, the terpolymer gave no response. It was completely ineffective in lowering the pour point.

The remarkable clarity of the isobutylene terpolymer can be shown by comparing the haze readings with a typical EVA copolymer. Measurements were made using a Coleman Model 9 Nepho-Colorimeter which is designed to measure haze. Since these pour depressants are sold in solvent to make handling and dilution easier, the haze measurements were made in 50% solutions of the polymer in HiSol 10 solvent. The results were:

|  | EVA Copolymer | EVE Terpolymer (Example 2) |
| --- | --- | --- |
| Haze-Nephelos Units | 408 | 5.5 |

EXAMPLE 3

A terpolymer, in accordance with the present invention, was prepared in the high pressure stirred autoclave by reacting ethylene and vinyl acetate with controlled amounts of isobutylene. The reactor pressure was 19,000 psi and temperature ranged from 273° F. to 436° F., bottom to top. The catalyst used was di-secbutyl peroxydicarbonate. The vinyl acetate was pumped at 102 gph (gallons per hour) and the isobutylene at 103 gph. The product had 35.6 percent vinyl acetate and a viscosity of 167 cP at 140° C. The haze reading was 212 compared to 408 for the similar EVA copolymer. To further characterize the terpolymer, the $CH_3/100\ CH_2$ ratio was determined by proton NMR and found to be 4.9. The typical value for an EVA copolymer is 2.0. Molecular weights were determined by Size Exclusion Chromatography (SEC) and determined to be as follows: Mn=770, Mw=2100.

This product was tested in two different fuels with the following results:

|  | POUR POINT °C. | | |
| --- | --- | --- | --- |
|  | Base Fuel | 100 ppm Terpolymer | 300 ppm Terpolymer |
| Fuel 1 | −13 | −28 | −32 |
| Fuel 2 | −10 | −22 | −32 |

These data show a good response when the additive was used in the fuel.

The terpolymer was tested for other important properties with the following results:

| Test | | | |
| --- | --- | --- | --- |
|  | Base Fuel 1 | Fuel 1 + 100 ppm Terpolymer | Fuel 1 + 300 ppm Terpolymer |
| Cold Filter Plugging Point | −7° C. | −14° C. | −22° C. |
|  | Base Fuel 2 | Fuel 2 + 100 ppm Terpolymer | Fuel 2 + 300 ppm Terpolymer |
|  | −9° C. | −16° C. | −17° C. |
|  | % Recovery with Terpolymer | | |
|  | 100 ppm | 200 ppm | Base Fuel |
| Fluidity Test Fuel 1 | 81 | 92 | 0 |
|  | Flow - °C. at 600 ppm terpolymer | | Base Fuel |
| Low Temperature Flow | −15 | | −10 |

These results show that the terpolymer is an effective pour depressant under vehicle use conditions.

EXAMPLE 4

A terpolymer was synthesized in the same equipment as Example 3 except that acetaldehyde was used as a modifier in addition to the isobutylene. The reactor temperature ranged from 275° F. at the bottom to 420° F. at the top. Pressure was 22,400 psig. The catalysts used were di-sec-butyl peroxydicarbonate and t-butyl peroctoate. The VA feed rate was 105 gph; the isobutylene feed rate was 28 gph and the acetaldehyde feed rate was 7 gph. The product had a vinyl acetate content of 36.4% and a viscosity of 158 cP at 140° C. The $CH_3/100\ CH_2$ ratio was 7.9. The sample was tested in fuel oil with the following results:

| Test | Result |
| --- | --- |
| CFPP | −24° C. |
| Fluidity Test | 82% |
| Low Temperature Flow Test | −22° C. |

EXAMPLE 5 AND COMPARATIVE EXAMPLE 6

A terpolymer of ethylene, vinyl acetate and isobutylene was prepared by feeding ethylene gas, at a temperature of 120° F. and a pressure of 22,600 psi, vinyl acetate at a rate of 230 gallons per hour and isobutylene at a rate of 65 gallons per hour into a high pressure autoclave reaction. The reactor was maintained at an average temperature of 340° F. and at a pressure of 22,600 psi.

The product meets the requirements for a commercial pour depressant additive.

Obviously, other modifications and variations of the present invention are possible in light of the above teachings. It is therefore to be understood that changes may be made in the particular embodiments of the invention which are within the full intended scope of the invention as defined by the appended claims.

I claim:

1. A terpolymer useful as a pour depressant for distillate fuel oils, said terpolymer comprising ethylene, vinyl acetate and isobutylene wherein the number average molecular weight of said terpolymer is from about 400 to about 1200, the weight average molecular weight of said terpolymer is from about 1500 to about 3000, and said terpolymer has a vinyl acetate content of from about 30 to about 45 weight percent, an isobutylene content effective to provide a methyl/100 methylenes ratio in said terpolymer of from about 2 to about 15, as determined by proton NMR, and the balance being ethylene.

2. The terpolymer of claim 1 wherein said terpolymer has a viscosity of from about 100 to about 300 cP at 140° F.

3. The terpolymer of claim 2 having a viscosity of from about 130 to about 230 cP at 140° F.

4. The terpolymer of claim 1 having a vinyl acetate content of from about 30 to about 40 percent by weight.

5. The terpolymer of claim 1 wherein the number average molecular weight is about 500 to about 900 and the weight average molecular weight is about 2000 to about 2500.

6. The terpolymer of claim 1 having a methyl/100 methylenes ratio of about 4 to about 12 as determined by proton NMR.

7. A distillate fuel oil composition having improved pour and flowability characteristics comprising a major proportion of a distillate fuel oil and a pour point depressant effective amount of a terpolymer comprised of ethylene, vinyl acetate and isobutylene, said terpolymer having a number average molecular weight of from about 400 to about 1200, a weight average molecular weight of from about 1,500 to about 3,000, a vinyl acetate content of from about 30 weight percent to about 45 weight percent and an isobutylene content effective to provide a methyl/100 methylenes ratio of from about 2 to about 15, as determined by proton NMR.

8. The distillate fuel oil composition of claim 7 wherein said terpolymer has a viscosity of from about 100 to about 300 cP at 140° F.

9. The distillate fuel oil composition of claim 7 wherein said terpolymer has a vinyl acetate content of from about 30 to about 40 percent by weight.

10. The distillate fuel oil composition of claim 7 wherein said terpolymer has a viscosity of from about 130 to about 230 cP at 140° F.

11. The distillate fuel oil composition of claim 7 wherein the number average molecular weight of said terpolymer is about 500 to about 900 and the weight average molecular weight of said terpolymer is about 2000 to about 2500.

12. The distillate fuel oil composition of claim 7 wherein the terpolymer has a methyl/100 methylenes ratio of about 4 to about 12 as determined by proton NMR.

13. The distillate fuel oil composition of claim 7 wherein the effective pour point depressant amount of said terpolymer is about 100 to about 1000 ppm by weight of said fuel oil.

14. The distillate fuel oil composition of claim 7 wherein the effective pour point depressant amount of said terpolymer is about 200 to about 800 ppm by weight of said fuel oil.

* * * * *

UNITED STATES PATENT AND TRADEMARK OFFICE
CERTIFICATE OF CORRECTION

PATENT NO. : 5,256,166
DATED : October 26, 1993
INVENTOR(S) : Joseph Fischer

It is certified that error appears in the above-indentified patent and that said Letters Patent is hereby corrected as shown below:

Column 1, line 68, "terpolyumers" should read --terpolymers--.

Column 2, line 1, "ethylenevinyl" should read --ethylene-vinyl--; line 29, "tylene-is" should read --tylene is--; line 30, "and-isobutylene" should read --and isobutylene--; line 34, "viscosity-and-vinyl" should read --viscosity and vinyl--; line 35, "Moreover;" should read --Moreover,--; line 41, "ethylenevinyl" should read --ethylene-vinyl--.

Column 5, line 65, "these-data" should read --these data--.

Column 6, line 40, insert --The product meets the requirements for a commercial pour depressant additive.--

Column 6, lines 50 and 51, delete "The product meets the requirements for a commercial pour depressant additive." and insert the following:

--The product of this continuous reaction, a terpolymer of ethylene, vinyl acetate and isobutylene, was characterized by a vinyl acetate content of 41.6% by weight and a viscosity of 219 cp measured at 140°C by a Brookfield [trademark] to viscometer equipped with a Thermocel [trademark] to control and monitor temperature. It was further characterized by a $CH_3/1000$ $CH_2$ ratio of 7.0; a number average molecular weight of 1078; and a weight average molecular weight of 2,860.

UNITED STATES PATENT AND TRADEMARK OFFICE
CERTIFICATE OF CORRECTION

PATENT NO. : 5,256,166
DATED : October 26, 1993
INVENTOR(S) : Joseph Fischer

It is certified that error appears in the above-indentified patent and that said Letters Patent is hereby corrected as shown below:

A terpolymer of ethylene, vinyl acetate and 1-butene was prepared in the same reactor. In this reaction, ethylene gas was fed into the reactor at a pressure of 20,000 psi and a temperature of 130°F along with vinyl acetate, which entered the reactor at a rate of 75 gallons per hour and 1-butene which was introduced into the reactor at a rate of 75 gallons per hour. The polymerization reaction was conducted at a pressure of 20,000 psi and a temperature of 330°F ± 3°F.

The product of this continuous reaction, a copolymer of ethylene, vinyl acetate and 1-butene, was characterized by a vinyl acetate content of 43.2% by weight; a viscosity of 140°C of 161 cp.; a $CH_3/100\ CH_2$ ratio of 9.5; a number average molecular weight of 1,264; and a weight average molecular weight of 3,040.

The isobutylene terpolymer of Example 5 and the 1-butene terpolymer of Comparative Example 6 were each dissolved in a well known commercially available aromatic solvent, Hi-Sol [trademark] 10 in a 50% by weight solution.

Solutions of the ethylene-vinyl acetate-isobutylene terpolymer and the ethylene-vinyl acetate-1-butene terpolymer, each in Hi-Sol 10, were added to straight run diesel fuel at concentrations of 200 ppm and 400 ppm, based on the weight of the terpolymers. These samples were tested to determine their respective pour points. As a control, the pour point of the same diesel fuel to which the two terpolymers were added was tested without the addition of either of the terpolymers. The results of these tests, conducted in accordance with ASTM D-97, is summarized below.

UNITED STATES PATENT AND TRADEMARK OFFICE
CERTIFICATE OF CORRECTION

PATENT NO. : 5,256,166

DATED : October 26, 1993

INVENTOR(S) : Joseph Fischer

It is certified that error appears in the above-indentified patent and that said Letters Patent is hereby corrected as shown below:

| Example No. | Product | Pour Point, °F |
|---|---|---|
| Control | Diesel Fuel without additive | 0 |
| 5 | Diesel Fuel with 200 ppm Isob. Terp. | -20 |
| CE6 | Diesel Fuel with 200 ppm 1-But. Terp. | - 5 |
| 5 | Diesel Fuel with 400 ppm Isob. Terp. | -25 |
| CE6 | Diesel Fuel with 400 ppm 1-But. Terp. | - 5 --. |

Signed and Sealed this

Twelfth Day of July, 1994

Attest:

BRUCE LEHMAN

Attesting Officer

Commissioner of Patents and Trademarks